(12) United States Patent
Wang et al.

(10) Patent No.: US 6,311,994 B1
(45) Date of Patent: Nov. 6, 2001

(54) SKATEBOARD-LIKE EXERCISER

(76) Inventors: Leao Wang; Peter Wu, both of No 1, Lane 233, Sec. 2, Charng Long Rd., Taiping (TW), 411

( * ) Notice: Subject to any disclaimer, the term of this patent is extended or adjusted under 35 U.S.C. 154(b) by 0 days.

(21) Appl. No.: 09/658,974

(22) Filed: Sep. 11, 2000

(51) Int. Cl.⁷ .................................................. B62M 1/00
(52) U.S. Cl. ...................................... 280/87.041; 280/267
(58) Field of Search ........................... 280/11.19, 87.01, 280/87.041, 87.042, 87.043, 87.05, 221, 220, 263, 264, 267

(56) References Cited

U.S. PATENT DOCUMENTS

| | | | | |
|---|---|---|---|---|
| 1,530,165 | * | 3/1925 | Fowler | 280/87.042 |
| 1,611,307 | * | 12/1926 | Forse | 280/87.041 |
| 1,689,916 | * | 10/1928 | Fisher | 280/87.041 |
| 1,844,305 | * | 2/1932 | White | 280/87.041 |
| 2,030,796 | * | 2/1936 | Kanengeiser | 280/87.041 |
| 2,180,143 | * | 11/1939 | Fletcher | 280/87.041 |
| 2,439,556 | * | 4/1948 | Bancroft | 280/87.041 |
| 2,723,131 | * | 11/1955 | McChesney, Jr. | 280/221 |
| 3,006,659 | * | 10/1961 | Krasnoff et al. | 280/87.041 |
| 3,180,656 | * | 4/1965 | Gruenstein | 280/255 |
| 3,834,726 | * | 9/1974 | Hobza | 280/87.041 |
| 3,992,029 | * | 11/1976 | Washizawa et al. | 280/221 |
| 4,123,079 | * | 10/1978 | Biskup | 280/87.042 |

* cited by examiner

*Primary Examiner*—Brian L. Johnson
*Assistant Examiner*—Bridget Avery
(74) *Attorney, Agent, or Firm*—Dougherty & Troxell; Kuo-Hsiung Chiu

(57) ABSTRACT

The present invention relates to a skateboard-like exerciser primarily comprising a blocking connecting rod interposed between a braking unit behind the deck and the main frame. When the blocking connecting rod is not touched first, the braking unit can't be pressed for reaching an expected braking effect. Consequently, a danger can be avoided when the braking plate is unintentionally pressed. Moreover, a resilient body is disposed at a proper position between the deck and the main frame, and the main frame contains a plurality of locking holes so that the locking position of the resilient body can be adjusted backwards or forwards. In addition to obtaining the cushioning effect, the touch sensitivity of the braking plate is synchronically adjustable.

6 Claims, 4 Drawing Sheets

SKATEBOARD-LIKE EXERCISER

BACKGROUND OF THE INVENTION

1. Field of the Invention

The present invention relates to a skateboard-like exerciser, and more particularly to a skateboard-like exerciser with a connecting safety rod and a buffer unit.

2. Description of the Prior Art

The braking unit of the present skateboard-like exerciser is fitted above the rear wheel assembly, and a proper clearance is kept between the braking unit and the rear wheel assembly. In order to obtain a braking effect during the motion of the exerciser, it's only required to press the braking unit with one foot to touch the rear wheel at the bottom end thereof. This configuration and the operational way are very easy and can reach the expected braking effect. However, if any unexpected external force during the motion, causing by a careless operation of the user, is exerted upon the braking unit, it's possible to bring about a serious accident.

SUMMARY OF THE INVENTION

It is a main object of the present invention to provide a skateboard-like exerciser which is fitted with a connecting safety rod which brings the braking unit into effect only through a proper actuation procedure so that the safety of the user is ensured.

It is another object of the present invention to provide a skateboard-like exerciser which is fitted with a buffer unit for a comfortable operation over the rough road.

BRIEF DESCRIPTION OF THE DRAWINGS

The drawings disclose illustrative embodiments of the present invention which serve to exemplify the various advantages and objects hereof, and are as follows.

DETAILED DESCRIPTION OF THE PREFERRED EMBODIMENT

Figure 1:
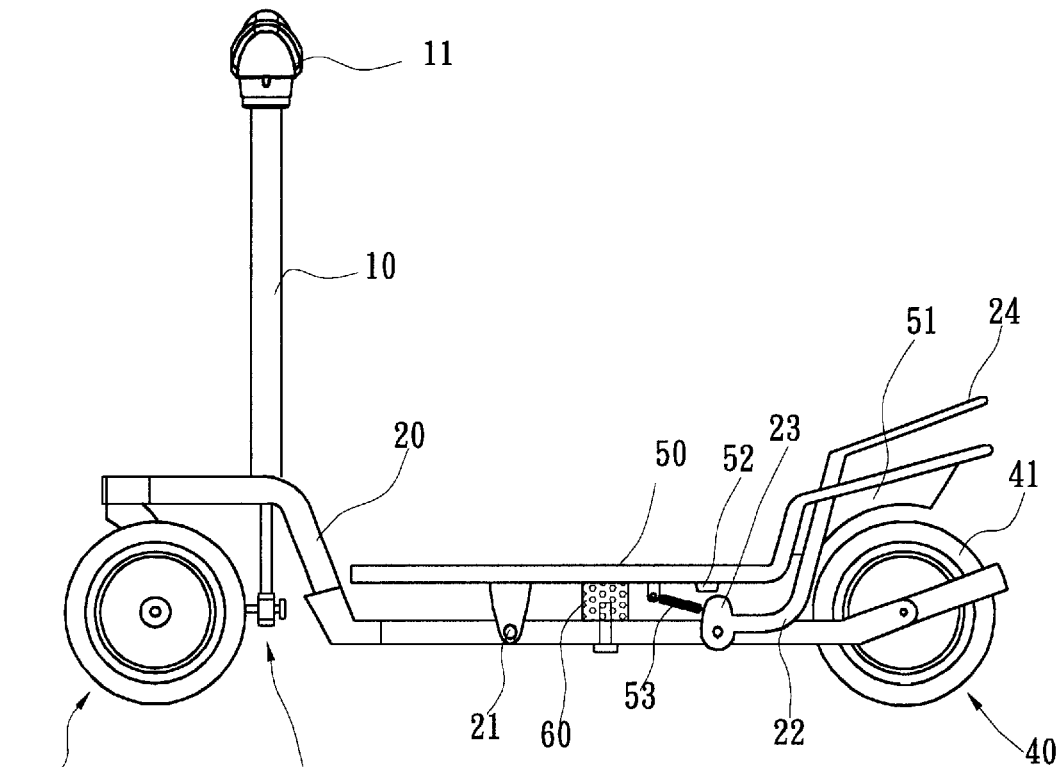
FIG. 1 is a side view of a preferred embodiment of the present invention.

First of all, referring to FIG. 1, it shows a preferred embodiment of the present invention which includes the following basic components:

a front supporting bar 10 having a handgrip 11 at the top thereof, the bottom end thereof being joined with a main frame 20 in order to control the motion direction in coordination with a steering unit 12;

a main frame 20 connected with a front and a rear wheel unit 30, 40 at the bottom of the front and the rear end thereof and having a turning shaft 21 at a certain position for pivoting with a deck 50; and a deck 50 raised upward at the rear end thereof for covering the top of the rear wheel unit 40, a braking plate 51 being formed at the top of the rear wheel unit 40.

Figure 2:
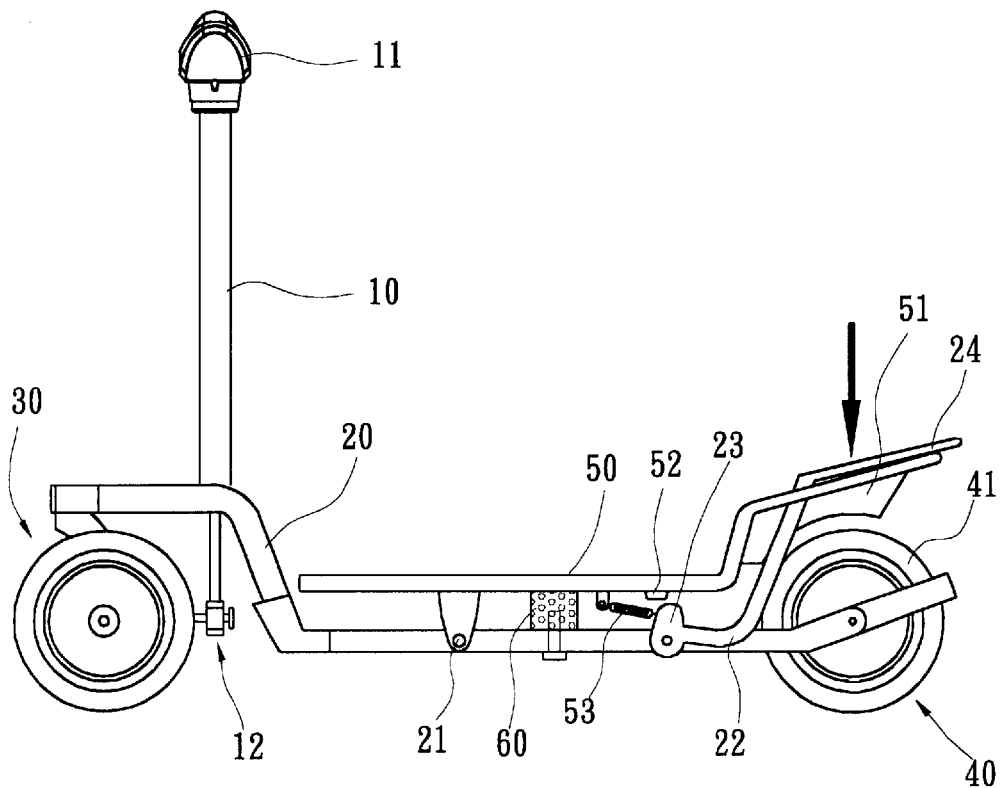
FIG. 2 is a side view of FIG. 1 showing the operational step.
Figure 3:
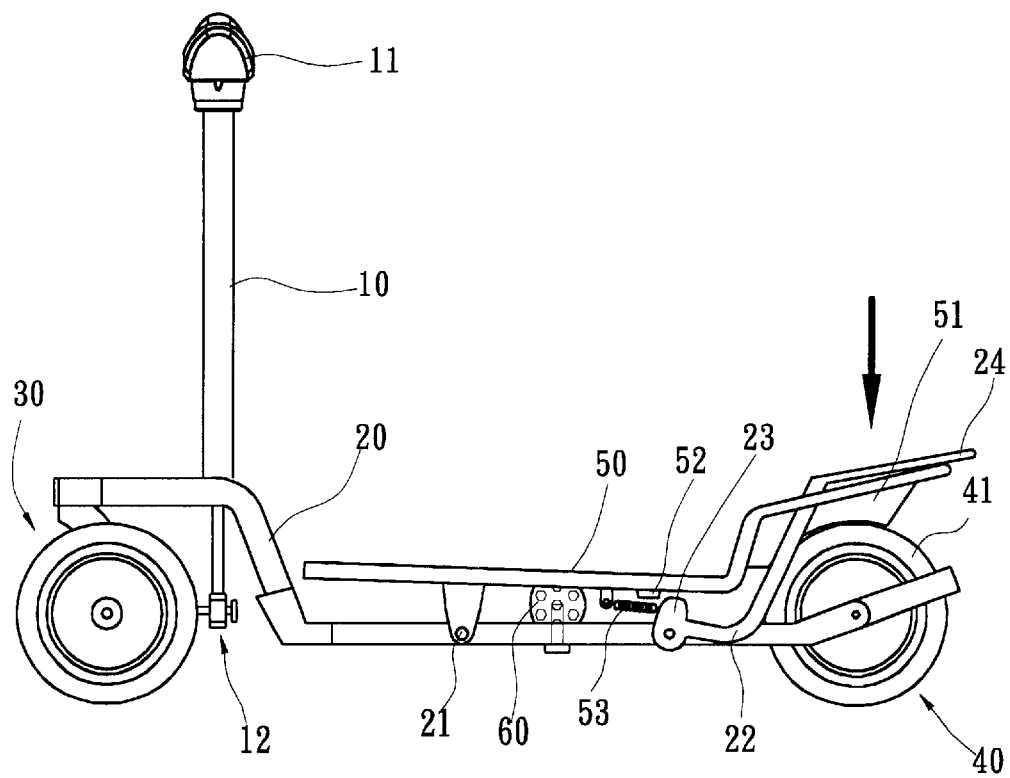
FIG. 3 is a side view of FIG. 1 showing another operational step.

The present invention is characterized in that the main frame 20 is pivoted with a connecting rod 22 for blocking at a proper position thereof while the head 23 of the connecting rod 22 is swollen to form a supporting state by means of an extension piece 52 at the bottom end of a corresponding position of the deck 50, and that the connecting rod 22 is constantly pulled to a supporting position by a strong spring 53 at the bottom end of the deck 50. Thereafter, the rear end 24 of the connecting rod 22 is protruding outside of the braking plate 51 of the deck 50. As shown in FIG. 2, before the deck 50 is turned on the pivot 21 in order for the braking plate 51 to press against the rear wheel 41 of the rear wheel unit 40 for creating an expected braking effect, the blocking connecting rod 22 must be contacted first in order to remove the head 23 from the supporting position with the extension piece 52 of the deck 50. A completion state is shown in FIG. 3. In brief, if the blocking connecting rod 22 is not contacted first, the braking plate 51 can't be pressed for a braking effect. Consequently, a danger can be avoided when the braking plate 51 is unintentionally pressed.

Figure 4:
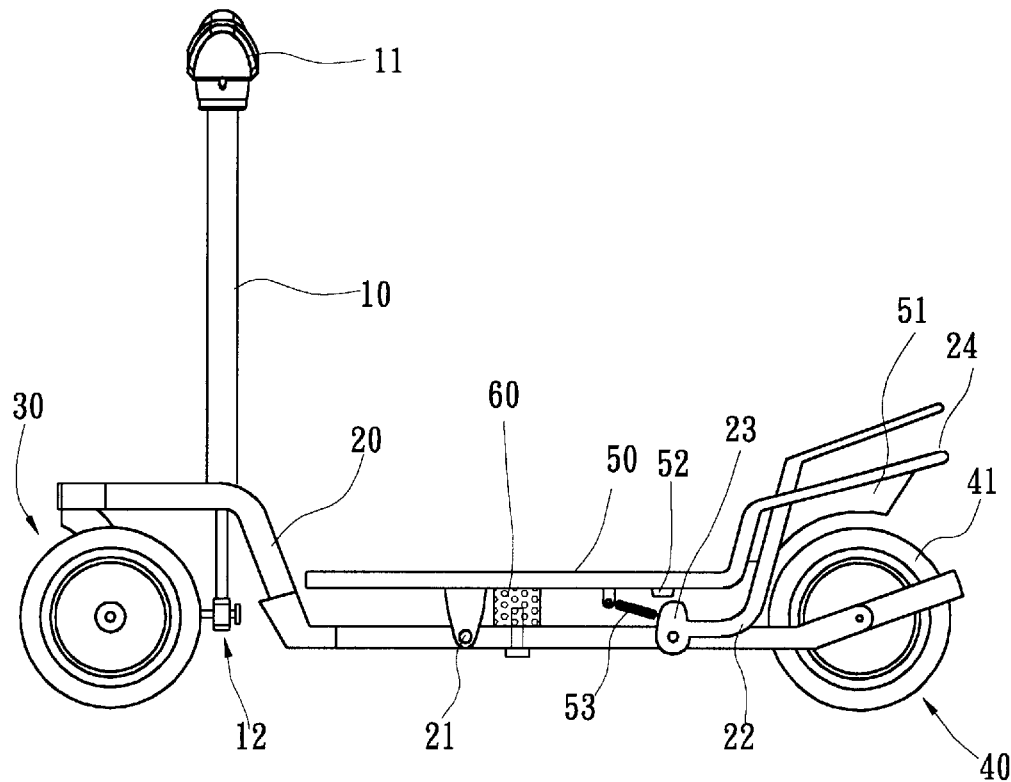
FIG. 4 is a side view of another preferred embodiment of the present invention.

Referring to FIGS. 1 and 4, the present invention furthermore includes a resilient body 60 at a proper position between the deck 50 and the main frame 20, and the main frame contains a plurality of locking holes (not shown) so that the locking position of the resilient body 60 can be adjusted backwards or forwards. Besides, the touch sensitivity of the braking plate 51 is synchronically adjustable.

Figure 5:
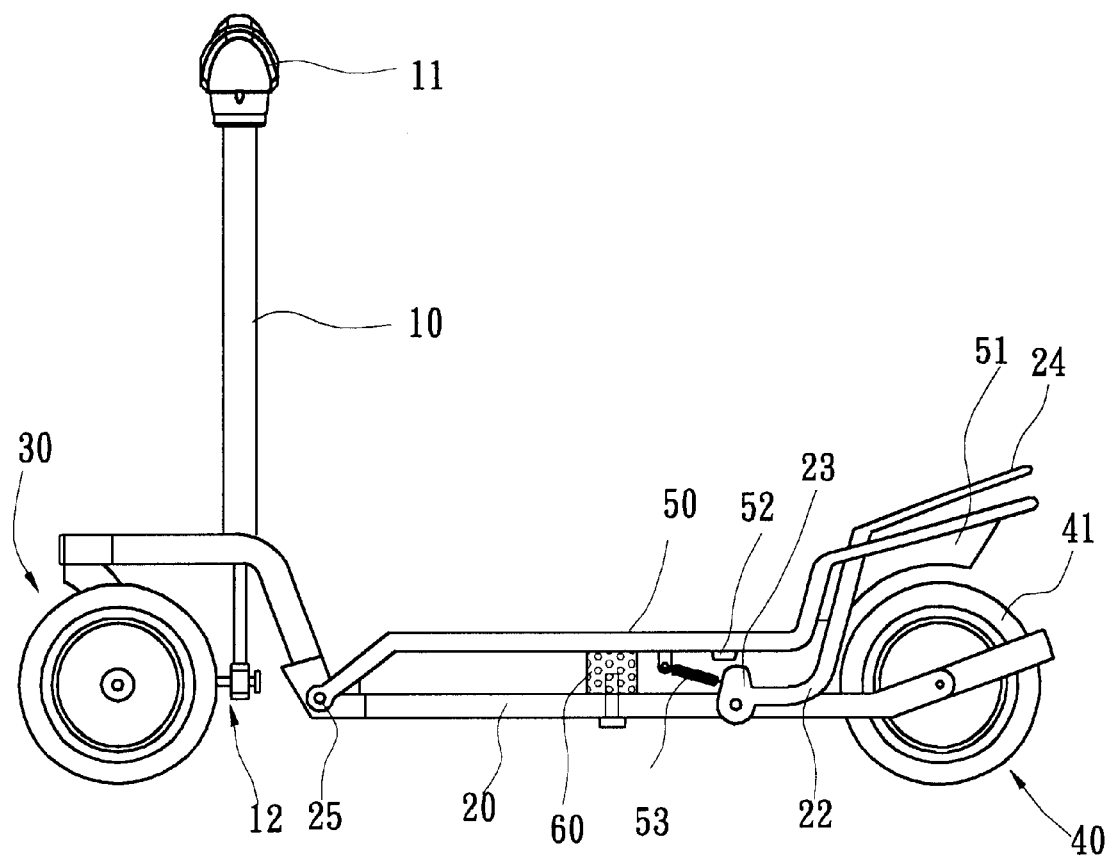
FIG. 5 is a side view of a further preferred embodiment of the present invention.

Of course, as shown in FIG. 5, the deck 50 can be pivoted with the main frame 20 by means of a pivot 25 at the front end thereof in order to increase the adjusting space of the resilient body 60.

Figure 6:
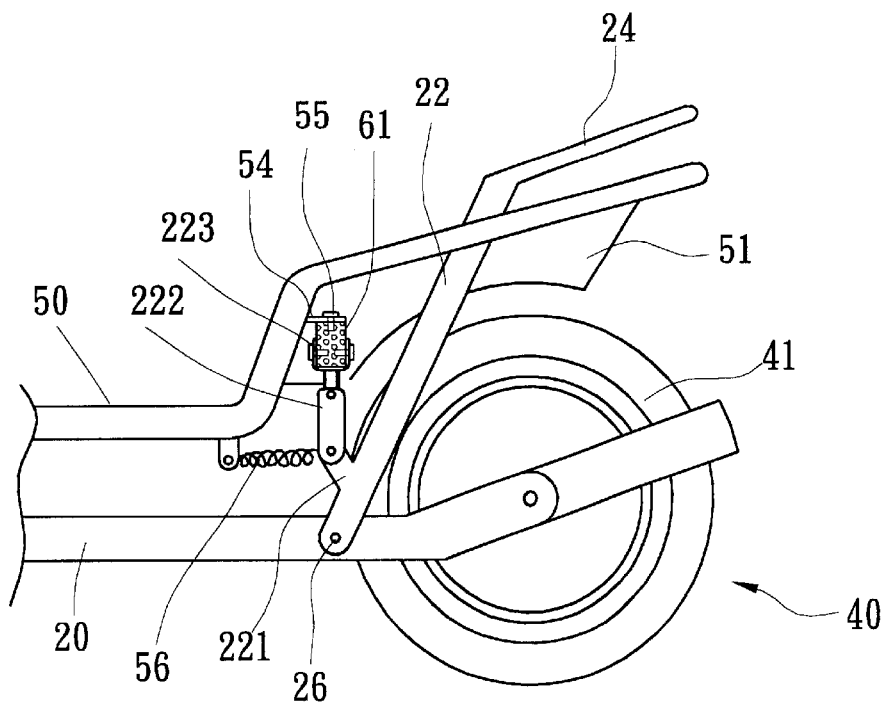
FIG. 6 is a partial side view of still another preferred embodiment of the present invention.
Figure 7:
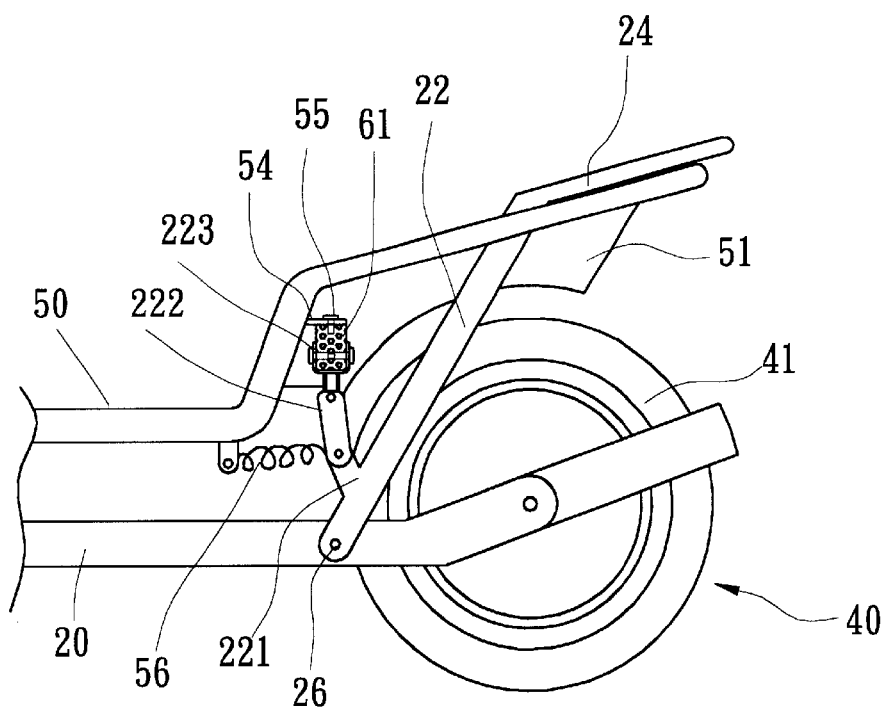
FIG. 7 is a partial side view of FIG. 6 showing the operation of the present invention.

Referring to FIGS. 6 and 7, they show another preferred embodiment of the present invention. The blocking connecting rod 22 includes a post extending upwards near a pivot 26 of the main frame 20. The top of the post 221 is pivoted with a connecting piece 222. And the top of the connecting piece 222 is pivoted with a seat 223 for fixing a resilient body 61. In addition, the deck 50 includes a protruding plate 54 that is disposed at the corresponding position of the resilient body 61 and is screwed with the resilient body 61 by means of a screw 55. Accordingly, the protruding plate 54, the resilient body 61 and the connecting piece 222 are constantly situated at a blocking position of a vertical straight line by means of pulling effect of a strong spring 56. Thus, the braking plate 51 can't be pressed to reach the braking effect when the blocking connecting rod 22 is not touched first, and the using safety can therefore be ensured.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A skateboard exerciser comprising:
   a) a main frame connected with a front and a rear wheel unit at a bottom of a front and a rear end thereof, the main frame having a turning shaft;
   b) a front supporting bar having a handgrip at a top thereof, a bottom end thereof being joined with the main frame in order to control a motion direction in coordination with a steering unit;
   c) a deck pivotally connected to the main frame and raised upward at a rear end thereof for covering a top of the rear wheel unit, and having a braking plate located adjacent to the top of said rear wheel unit; and d) a blocking connecting rod pivotally connected to the main frame and having a portion located between the main frame and the deck, the blocking connecting rod being movable between a first position wherein movement of the braking plate into contact with the top of the rear wheel is prevented, and a second position permitting movement of the braking plate into contact with the top of the rear wheel to provide a braking effect.

2. The skateboard exerciser as claimed in claim 1 wherein the blocking connection rod further comprises an enlarged head located between the main frame and the deck whereby the enlarged head supports the deck when the blocking connection rod is in the first position.

3. The skateboard exerciser as claimed in claim 1 further comprising a spring acting on the blocking connection rod so as to bias the blocking connection rod toward the first position.

4. The skateboard exerciser as claimed in claim 1 wherein the blocking connection rod has a rear end portion located such that a portion of the deck with the braking plate is located between the rear end portion and the top of the rear wheel.

5. The skateboard exerciser as claimed in claim 1 further comprising:

a) a post extending from the blocking connecting rod;

b) a connecting piece pivotally connected to the post;

c) a resilient body mounted on the connecting piece and to the deck; and, d) a spring acting between the post and the deck so as to bias the blocking connecting rod to the first position.

6. The skateboard exerciser as claimed in claim 1 further comprising a resilient body interposed between and acting on the main frame and the deck.

* * * * *